June 20, 1939.　　W. L. CHURCH　　2,162,799

WELL SCREEN

Filed Jan. 17, 1936

Inventor
Walter L. Church

By Hardway Rather
Attorneys

Patented June 20, 1939

2,162,799

UNITED STATES PATENT OFFICE 2,162,799

WELL SCREEN

Walter L. Church, Houston, Tex.

Application January 17, 1936, Serial No. 59,516

3 Claims. (Cl. 166—8)

This invention relates to a well screen.

An object of the invention is to provide a screen designed to be set in the producing stratum of an oil or water well to screen out the sand or other detritus and to permit the inflow of liquid and which may readily unclogged in case the screen surface becomes clogged.

It is not uncommon for well screens, particularly when set in oil-bearing strata, to become clogged by the deposit of sand, paraffin, and the like, on the screen surface to such an extent as to substantially exclude the inflow of the liquid.

It is an object of the invention to provide a screen of the character described that may be readily opened up, in case it becomes clogged by clogging material, so as to permit a resumption of the inflow of the surrounding liquid.

It is another object of the invention to provide a screen of the character described comprising a perforated tubular support which is perforated and wrapped with a screen wire whose turns are spaced apart, the support being formed with flexible portions which may be flexed outwardly to impart vibration and relative movement to the screen wire so as to destroy the obstructing coating about the screen.

With the above and other objects in view, the invention has particular relation to certain novel features of construction, arrangement of parts and use, an example of which is given in this specification and illustrated in the accompanying drawing wherein.

Figure 1:
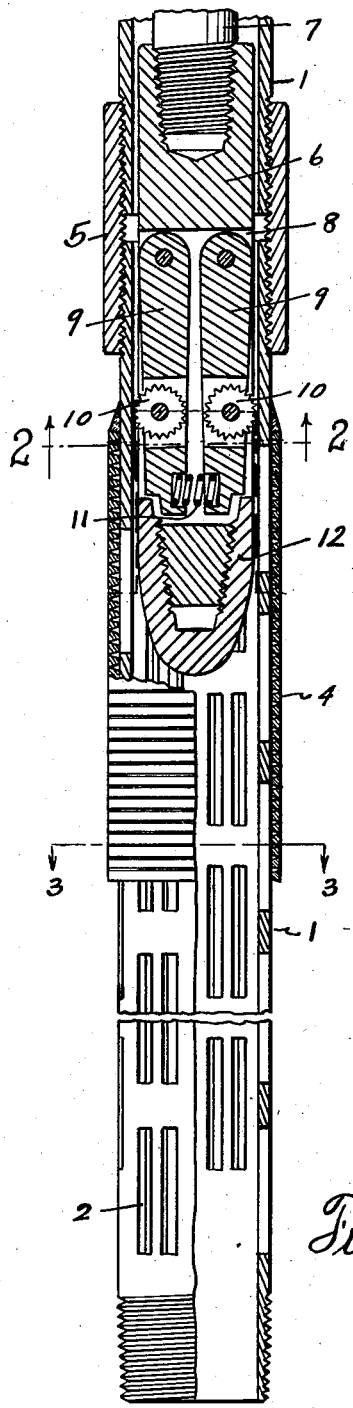
Figure 1 shows a longitudinal sectional view of the screen.

Referring now more particularly to the drawing wherein like numerals of reference designate similar parts in each of the figures, the numeral 1 designates a tubular support which will usually be a metal pipe. This support has the lengthwise perforations 2 preferably arranged in pairs, as shown, and spaced apart to provide the flexible portions 3 which are supported only at the ends. A screening element 4 surrounds the support 1. This screening element is usually in the form of a spirally wound wire having its turns spaced apart and shaped to provide inwardly widened slits between the turns of the wire. The screen may be formed of the required number of sections connected by couplings, as 5.

Usually in oil wells a coating gradually forms on the screening element 4 composed of sand, paraffin, and other clogging elements. In some cases this coating becomes impervious so as to completely exclude the inflow of the liquid. In such cases a suitable implement may be run down into the screen and so operated as to flex the portions 3 outwardly. These outwardly flexible portions are distributed substantially throughout the screen area, and as they are moved outwardly and vibrated the screening element will be correspondingly moved, thus causing a breaking up of the surrounding coating and the creation of fissures therein so as to permit a resumption of the inflow of the liquid in the well.

An implement specially designed for the purpose indicated is shown inserted into the screen in Figure 1. It embodies the head 6 attached to the lower end of the operating string 7 and having a transverse slot 8 therethrough. In this slot are the arms 9, 9, pivoted at their upper ends and whose lower ends are free to move outwardly. The arms 9 have the rollers 10, 10, mounted in slots therein, and said rollers project outwardly beyond the arms.

Figure 2:
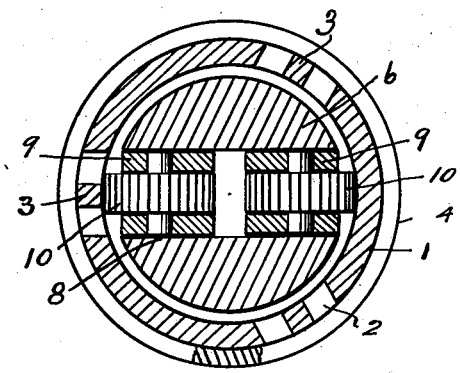
Figure 2 shows a transverse sectional view taken on the line 2—2 of Figure 1.
Figure 3:
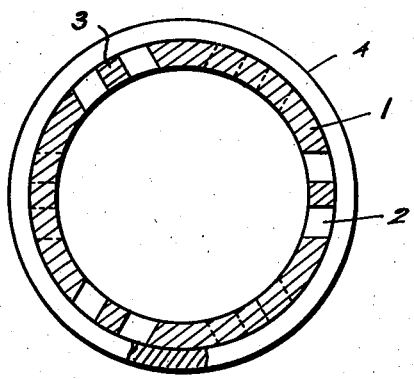
Figure 3 shows a transverse sectional view taken on the line 3—3 of Figure 1.

A strong coil spring 11 is mounted between the lower ends of said arms and acts to hold the rollers 10 yieldingly against the inner sides of the screen support 1. A guide 12 is threaded to the lower end of the head 6 and its upper end surrounds the lower ends of the arms 9 to limit the outward movement of said arms. The surfaces of the rollers 10 are transversely corrugated, as shown. The tool may be inserted into the screen and moved up and down and rotated, and the rollers 10 will ride along the outwardly flexible portions 3, as illustrated in Figure 2, and will flex said portions outwardly as well as vibrate the same so as to destroy the obstructing coating on the screen surface 4 and open up fissures therein for the inflow of the liquid.

The drawing and description disclose what is now considered to be a preferred form of the invention by way of illustration only, while the broad principle of the invention will be defined by the appended claims.

What I claim is:

1. A well screen comprising a pipe having longitudinally elongated perforations substantially throughout the area thereof and of uniform width radially arranged to produce portions between the perforations which are supported only at their ends and whose radial dimensions are such that their intermediate portions are capable of being flexed an appreciable distance outwardly, and a screening element wound spirally about the pipe and having its turns spaced apart.

2. In a well screen, a tubular support formed of substantially rigid material and having longitudinally elongated slots substantially throughout the area thereof, so arranged as to provide elongated portions between the slots which are supported only at their ends, and being of such small radial dimensions that they are capable of being flexed an appreciable distance outwardly the width of said slots being approximately uniform throughout.

3. A well screen comprising a tubular support formed of substantially rigid material and having longitudinally disposed series of slots arranged in pairs, the pairs of each series being arranged to produce long narrow portions between them, said portions being supported only at their ends and being of such small cross sectional area that they are capable of being flexed an appreciable distance outwardly the pairs of one series being staggered with relation to the pairs of the neighboring series, the ends of the slots of each series circumferentially overlapping the ends of the slots of neighboring series and a screening element wound spirally about the support and having its turns spaced apart.

WALTER L. CHURCH.